United States Patent [19]

Gornowicz et al.

[11] E Patent Number: Re. 33,141

[45] Reissued Date of Patent: Jan. 2, 1990

[54] MOISTURE RESISTANT POLYURETHANES DERIVED FROM NON-AROMATIC DIISOCYANATES AND POLYDIORGANOSILOXANES AND A METHOD FOR PREPARING SAME

[75] Inventors: Gerald A. Gornowicz; Chi-Long Lee, both of Midland, Mich.

[73] Assignee: Dow Corning Corporation, Midland, Mich.

[21] Appl. No.: 140,700

[22] Filed: Jan. 4, 1988

Related U.S. Patent Documents

Reissue of:

[64] Patent No.: 4,631,329
Issued: Dec. 23, 1986
Appl. No.: 802,880
Filed: Nov. 29, 1985

[51] Int. Cl.[4] ..... C08G 18/38

[52] U.S. Cl. ..... 528/28; 528/61; 528/65; 528/76; 528/77; 528/81; 528/83

[58] Field of Search ..... 528/28, 61, 65, 76, 528/77, 81, 83

[56] References Cited

U.S. PATENT DOCUMENTS

| | | | |
|---|---|---|---|
| 3,886,226 | 5/1975 | Asai et al. | 260/858 |
| 3,923,747 | 12/1975 | Kolycheck | 260/77.5 AM |
| 4,098,742 | 7/1978 | Mueller | 428/911 |
| 4,447,590 | 5/1984 | Szycher | 528/76 |
| 4,523,005 | 6/1985 | Szycher | 528/76 |

FOREIGN PATENT DOCUMENTS

| | | |
|---|---|---|
| 0068385 | 6/1982 | European Pat. Off. . |
| 0078958 | 10/1982 | European Pat. Off. . |

OTHER PUBLICATIONS

Article, "Structure-Property Relationships of Transparent Aliphatic Polyurethane Elastomers from the Geometric Isomers of Methylene BIS(4-Cyclohexyl Isocyanate)", Shaio-wen Wong et al., *Advances in Urethane Science & Technology,* Technomic, vol. 9, 1984.

*Primary Examiner*—Maurice J. Welsh
*Attorney, Agent, or Firm*—Robert Spector

[57] ABSTRACT

The reduction in tensile strength exhibited in high humidity environments by "soft" polyurethanes prepared from aliphatic or cycloaliphatic diisocyanates can be substantially reduced if the molar ratio of diisocyanate and chain extender to isocyanate-reactive species other than said chain extender in the reaction mixtures from which said polyurethanes are prepared is at least 4.

16 Claims, No Drawings

MOISTURE RESISTANT POLYURETHANES DERIVED FROM NON-AROMATIC DIISOCYANATES AND POLYDIORGANOSILOXANES AND A METHOD FOR PREPARING SAME

Matter enclosed in heavy brackets [ ] appears in the original patent but forms no part of this reissue specification; matter printed in italics indicates the additions made by reissue.

FIELD OF THE INVENTION

This invention relates to [the preparation of] polyurethanes. More particularly, this invention relates to [the preparation of] polyurethanes *prepared* from aliphatic or cycloaliphatic diisocyanates *and polydiorganosiloxanes*. These polymers are characterized by their ability to retain tensile properties in high humidity environments.

BACKGROUND OF THE INVENTION

Polyurethanes are typically prepared by reacting a diisocyanate with a relatively high molecular weight polyol. The diisocyanate can be aromatic, such as tolylene diisocyanate, aliphatic, such as hexamethylene diisocyanate, or cycloaliphatic, such as 4,4'-dicyclohexyl diisocyanate, and the polyol can be of the polyester or polyether type. A diol or diamine containing from 2 to about 10 carbon atoms can be included among the reactants used to prepare the polyurethane as a chain extender to vary the properties of the final polymer. The prior art describes numerous types of polyurethanes and methods for their preparation.

Polyurethanes derived from aliphatic or cycloaliphatic diisocyanates retain their mechanical properties upon exposure to light and oxygen. Polyurethanes derived from aromatic diisocyanates not only lose their tensile properties under these conditions, but also decompose to form highly toxic aromatic amines when exposed to the elevated temperatures required to fabricate these polymers.

A shortcoming of many polyurethanes derived from aliphatic or cycloaliphatic diisocyanates and diol type chain extenders is their tendency to lose 60 percent or more of their initial tensile strength in environments where the relative humidity is above 50 percent. This has prevented the widespread acceptance of this class of polyurethanes in medical applications such as catheter tubing and surgical implants. In these applications the polymer must retain a useful level of tensile properties in the presence of aqueous solutions and in environments where the relative humidity exceeds 50%.

The hardness of a polyurethane is determined at least in part by the ratio of the combination of diisocyanate and chain extender present to polyol and the molecular weight of the polyol. Polyurethanes classified as "soft" typically exhibit durometer values of less than 90, measured on the Shore A scale. The molar ratio of the combination of diisocyanate and chain extender to polyol in these polymers is typically 3:1 or less. Expressed another way, the "hard" segment formed by the combination of diisocyanate and chain extender constitutes less than 80 mole percent of the polyurethane. U.S. Pat. No. 3,923,747, which issued to Kolycheck on Dec. 2, 1975 discloses polyurethanes of this type prepared using aliphatic diisocyanates.

U.S. Pat. No. 3,886,226, which issued to Asai et al. on May 27, 1975 exemplifies polyurethanes wherein the "hard" segments constitute more that 80 mole percent of the polymer, however all of these polymers are derived from aromatic diisocyanates. This limitation is not mentioned in the patent, and the claims are sufficiently broad to encompass polymers containing less than this concentration of hard segments. There is no teaching in the patent regarding the criticality of the aforementioned 80 mole percent limitation with respect to the tensile properties of polyurethanes derived from aliphatic diisocyanates.

Polyurethanes useful as coatings for glass and other substrates are disclosed in U.S. Pat. No. 4,098,742, which issued to Mueller on July 4, 1978. Both aromatic and aliphatic diisocyanates are considered useful starting materials for reaction with a specified class of perfluorinated diols and hydroxyalkyl substituted polyorganosiloxanes. Two of the exemplified polymers are derived from aliphatic diisocyanates and contain more than 80 mole percent of "hard" segments, however no polyester or polyether type polyols are used as reactants, nor is there any indication that any of the polymers disclosed in this patent are useful for anything other than coating materials.

European Patent Application No. 68,385, published on Jan. 5, 1983, discloses linear block copolymers containing polyurethane and polydiorganosiloxane segments. The polydiorganosiloxane segments constitute from 1 to 50 weight percent of the polymer, and form at least a portion of the "soft" segments of the polymer. The "hard" segments include an aromatic or aliphatic diisocyanate and any chain extenders. The chain extenders are typically low molecular weight diols or diamines. A characterizing feature of these polymers is the ratio of the total molecular weight of the soft segments to the total molecular weight of the polymer, which is from 0.4 to 0.8, however there are no limits defined for the relative concentrations of hard and soft segments other than an upper limit of 50 weight percent for the silicone portion, or the effect of this variable on the physical properties of the polymer.

European Patent Application No. 78,958, published on May 18, 1983, discloses polyurethanes derived from aliphatic, cycloaliphatic or aromatic diisocyanates, high molecular weight organic compounds containing two hydroxyl groups, a difunctional chain extender and from 1 to 15 weight percent, based on the final polymer, of a polydiorganosiloxane having isocyanate-reactive terminal groups. The molar ratio of isocyanate groups to reactive groups of the other ingredients used to prepare the final polymer is from 0.85:1 to 2:1, and the molar ratio of diisocyanate to chain extender can be from 0.2:1 to 30:1. Expressed another way, the "hard" segment consisting of isocyanate and chain extender units can constitute as little as 50 mole percent of the total segments present in the final polymer.

The prior art of which we are aware is silent regarding the adverse affect of humidity on the tensile properties of polyurethane elastomers derived from aliphatic or cycloaliphatic diisocyanates, or the desirability of incorporating at least 80 mole percent of "hard" segments into these polymers.

SUMMARY OF THE INVENTION

We have now found that the humidity-induced loss of tensile strength exhibited by "soft" polyurethanes derived from aliphatic and cycloaliphatic diisocyanates and diol or diamine type chain extenders is substantially reduced when the combined molar concentration of repeating units derived from the diisocyanate and chain extender with respect to total repeating units is at least 80 percent. A liquid polydiorganosiloxane containing isocyanate-reactive terminal groups is preferably included among the reactants to impart biocompatibility while retaining the tensile properties characteristic of polyurethanes. The term "soft" implies a hardness of less than 90 on the Shore A durometer scale.

DETAILED DESCRIPTION OF THE INVENTION

This invention provides a method for preparing a polyurethane exhibiting a hardness of less than 90 on the Shore A durometer scale and a retention of useful tensile properties under a relative humidity greater than 50%, said method comprising heating a reaction mixture comprising an aliphatic or cycloaliphatic diisocyanate, a diol or diamine chain extender [and], at least one polyol *and up to one equivalent amount, based on said polyol, of a polyorganosiloxane having two isocyanate-reactive terminal groups* for a period of time sufficient to form said polyurethane, wherein the molar ratio of the combination of said diisocyanate and chain extender to all isocyanate-reactive ingredients other than said chain extender is at least 4:1, respectively, and isolating the resultant polyurethane from said reaction mixture.

The present invention also encompasses polyurethanes prepared in accordance with the method described hereinabove. The polyurethanes comprise repeating units of the general formulae $$\underset{(1)}{-(O)C\overset{H}{N}R\overset{H}{N}C(O)-},\ \underset{(2)}{-XR'X-},\ \underset{(3)}{-OR''O-}$$

*and polydiorganosiloxane units* where R represents an alkylene or a cycloalkylene radical, R′ represents a hydrocarbylene radical containing from 2 to 10 carbon atoms, R″ represents the residue remaining following removal of the terminal hydroxyl groups of a polyether polyol or a polyester polyol and X is —NH— or —O—, with the proviso that the molar ratio of the combination of units represented by formulae (1) and (2) to all other repeating units in the polyurethane is at least 4:1.

[In a preferred embodiment of this invention up] *Up* to 50% mole percent of the polyol reactant is replaced by a liquid polydimethylsiloxane having terminal groups that are reactive with the diisocyanate. The total number of isocyanate-reactive groups remains unchanged.

The preparation of polyurethanes from aliphatic and cycloaliphatic diisocyanates, diol or diamine type chain extenders and polyether or polyester type polyols is well known. The characterizing feature of the present method resides in the hardness of the polymer, which is less than 90 on the Shore A scale, and in the molar ratio of the combination of diisocyanate and chain extender to polyol and any other isocyanate-reactive ingredients. This ratio is at least 4:1. Expressed another way, the combined concentrations of diisocyanate and chain extender in the compositions of this invention represents at least 80 mole percent of the total reactants. The accompanying examples demonstrate that this limitation is critical to retention of a useful level of tensile strength under a relative humidity of greater than 50%. Polyurethanes used for catheter tubing and surgical implants are typically exposed to these conditions during use.

Any of the known aliphatic and cycloaliphatic diisocyanates can be used to prepare polyurethanes in accordance with the present method. These diisocyanates include, among others, tetramethylene diisocyanate, hexamethylene diisocyanate, cyclohexane-1,4-diisocyanate and hydrogenation products of aromatic diisocyanates such as 4,4′-diphenylmethane diisocyanate.

Diol and diamine type chain extenders used to prepare polyurethanes typically contain from two up to ten or more carbon atoms. Chain extenders containing from two to six carbon atoms are preferred based on their cost, availability, and the properties imparted to the final product. Hexamethylene diamine and 1,4-butanediol are particularly preferred for this reason.

Classes of polyols that are typically reacted with the aforementioned diisocyanates to prepare polyurethanes include polyether and polyester polyols. Polyether polyols are hydroxyl end blocked polyalkylene glycols or polyalkylene oxides such as polyethylene oxide, polypropylene oxide and polytetramethylene oxide. Copolymers derived from two or more alkylene glycols or oxides can also be used. The molecular weight of these polyols is typically within the range of from 700 to about 3000 to obtain a polyurethane of the desired hardness.

Polyester polyols are derived from one or more of the aforementioned glycols or hydroxyl end blocked polyethers and an aliphatic or aromatic dicarboxylic acid such as adipic, maleic, succinic, phthalic or isophthalic acid.

[In a preferred embodiment of the present method up] *Up* to 50 mole percent of the polyol is replaced with an equivalent amount of a liquid polydiorganosiloxane having terminal groups that react with isocyanate groups. Isocyanate reactive groups include but are not limited to hydroxyl, amino and mercapto. The polydiorganosiloxane is preferably a polydimethylsiloxane having a molecular weight of at least 200, most preferably from 500 to 10,000. These polymers are sufficiently well described in the literature that a detailed discussion is not required in this specification. A particularly preferred polymer is an aminoalkyl end blocked polydimethylsiloxane wherein the aminoalkyl radical contains three or four carbon atoms.

As used herein the term "equivalent amount" implies that the number of moles of isocyanate-reactive groups present in the polydiorganosiloxane and in the quantity of polyol that it replaces must be equal. Typically the total number of isocyanate groups present in the reaction mixture is slightly in excess of the number of isocyanate-reactive groups.

[In accordance with the present method, the] *The* diisocyanate, chain extender, polyol and [optional] polydiorganosiloxane are reacted together at temperatures of from ambient to 100° C. or higher. The reaction can be conducted in the absence of other materials, however it is usually preferable to carry out the reaction in a liquid diluent because of the high viscosity of the final polyurethane. Liquid hydrocarbons boiling above about 80° C. under ambient conditions are suitable reaction media. Aromatic hydrocarbons such as toluene and xylene are particularly preferred.

Many of the known catalysts for condensation type polymerizations will facilitate the reaction of diisocyanates with polyols and other organic compounds containing isocyanate-reactive groups, and can be used in practicing the present method. Catalysts of this type include but are not limited to organotin compounds such as dibutyltin dilaurate, and tertiary amines such as triethylamine.

The order in which the various reactants are added to the reaction vessel is usually not critical, however it is generally preferred to first combine the diisocyanate with the polyol and any polydiorganosiloxane in the presence of one of the aforementioned diluents. The resultant mixture is then heated for about one hour or longer prior to adding the chain extender.

The final reaction mixture is heated at temperatures of from 50° to 150° C. for the time period required to attain the desired molecular weight. During this period it may be necessary to add diluent such as toluene to maintain the viscosity of the reaction mixture at a sufficiently low level that permits adequate stirring and heat transfer.

The following example demonstrates the superior retention of tensile properties in high humidity environments exhibited by *the present* polyurethanes [prepared in accordance with the present method]. All parts and percentages are by weight unless otherwise indicated.

The exemplified compositions represent preferred embodiments, and should therefore not be interpreted as limiting the scope of the invention as defined in the accompanying claims.

The general procedure for preparing a polyurethane was to charge the diisocyanate, toluene diluent and any polydiorganosiloxane into a nitrogen-filled reaction vessel equipped with a motor driven stirrer and a water cooled reflux condenser. The amount of toluene added initially was equal to from about 1½ to 2 times the weight of the diisocyanate. The polydiorganosiloxane was added as a 50% by weight solution in toluene. In some instances it was necessary to add tetrahydrofuran to solubilize the polydiorganosiloxane in the reaction mixture. After stirring for a few moments the polyol in either molten form or as a solution in toluene was added to the reactor together with an amount of dibutyltin dilaurate equivalent to 0.003 percent by weight of all reactants. The contents of the reactor were then heated to a temperature of from 95° to 100° C., at which time 1,4-butanediol or 1,6-hexamethylene diamine was added to the reaction mixture as the chain extender. The mixture was then heated with stirring at a temperature of from 90° to 105° C. until a polymer of the desired molecular weight was obtained. This time period was from 3 to 16 hours, depending upon the particular sample. In some instances it was necessary to add toluene and, in one instance, N,N-dimethylformamide to the reaction mixture when the reaction mixture became too viscous to stir. One sample gelled during the polymerization and was redissolved by adding N,N-dimethylformamide.

The diisocyanate was dicyclohexylmethane-4,4'-diisocyanate (HMDI), a hydrogenation product of diphenylmethane-4,4'-diisocyanate (MDI). A polyurethane prepared using MDI was used for comparative purposes to demonstrate the absence of any adverse effect of moisture on the tensile strength of a polymer prepared using an aromatic diisocyanate.

The polyol ingredient was a polytetramethylene glycol exhibiting a molecular weight of 1000 or 2000. The polydimethylsiloxanes (PDMS) contained dimethyl-(3-methylamino-2-methylpropyl)siloxane terminal units and exhibited the molecular weights listed in the following table.

The molar ratio of "hard" segments (isocyanate and chain extender) to "soft" segments (polyol and polydimethylsiloxane) was 5:1 or 7:1 in the compositions of this invention and 3:1 in the controls. The aromatic polyurethane prepared using MDI had a hard to soft segment ratio of 3:1.

The samples used to measure tensile properties were prepared by removal of the diluent from the polymerization reaction mixture under reduced pressure. The resultant solid was dried for at least two hours in a vacuum oven at a temperature of 100° C. and then compression molded to form "dog bone" type test specimens described in ASTM test method D 412.

The entries in the columns headed "% Loss" in the following table were calculated using the tensile strength measured at 0% relative humidity (RH) for each of the samples.

The samples conditioned at 0% relative humidity (RH) were stored in a dessicator in the presence of anhydrous calcium sulfate. The samples conditioned at 50% RH and 90% RH were stored in dessicators in the presence of a saturated aqueous solution of sodium hydrogen sulfate or water, respectively. The samples were not in contact with the liquid in the dessicator.

A fourth group of samples were immersed in water for 5 days under ambient conditions in a covered container.

Tensile strength measurements were performed immediately following removal of the samples from the dessicator or water in which they were conditioned.

In the following table the molar ratio of the hard segment (diisocyanate and chain extender) to the soft segment (polyol and any polydimethylsiloxane, represented by PDMS) is represented by "MR". The control samples are identified by "C" following the sample number.

| Sample | HMDI | Polyol | | Chain Ext. | PDMS | | |
|---|---|---|---|---|---|---|---|
| No. | parts | parts | MW | parts | parts | MW | MR |
| 1C | 53.5 | 97.9 | 1000 | 8.9 | 0 | | 3 |
| 2C | 37.4 | 59.9 | 1000 | 6.2 | 11.0 | 1241 | 3 |
| 3C | 37.4 | 62.3 | 1000 | 6.3 | 12.4 | 1388 | 3 |
| 4C | 53.5 | 95.9 | 1000 | 9.0 | 20.0 | 3030 | 3 |
| 5C | 26.7 | 110.1 | 2000 | 5.6* | 0 | | 3 |
| 6 | 53.5 | 123.3 | 2000 | 12.1 | 20.0 | 2836 | 5 |
| 7 | 53.5 | 108.8 | 2000 | 12.1 | 20.0 | 1388 | 5 |
| 8 | 53.4 | 109.6 | 2000 | 13.5 | 0 | | 7 |
| 9 | 53.4 | 112.0 | 2000 | 12.0 | 20.0 | 1388 | 5 |
| 10 | 53.4 | 123.6 | 2000 | 12.0 | 20.0** | 2214 | 5 |
| 11 | 53.4 | 78.6 | 2000 | 12.0 | 40.0** | 1388 | 5 |
| 12C | 34.3*** | 55.3 | 1000 | 5.6 | 10.0** | 1241 | 3 |

*1,6-Hexamethylenediamine used as the chain extender
**PDMS added as a 21 weight % solution in toluene
***MDI used as the diisocyanate

| Sample | Tensile Strength in Megapascals at | | | | | | |
|---|---|---|---|---|---|---|---|
| | 0% | | | 90% | | Water | |
| No. | RH | 50% RH | % Loss | RH | % Loss | Soak | % Loss |
| 1C | 39.1 | 34.5 | 12 | 11.7 | 70 | 13.7 | 65 |
| 2C | 51.2 | 41.2 | 20 | 13.1 | 74 | 11.7 | 77 |
| 3C | 43.0 | 35.2 | 18 | 14.1 | 67 | 13.0 | 70 |
| 4C | 38.6 | 35.7 | 8 | 11.9 | 69 | 15.5 | 60 |
| 5C | 47.4 | 38.2 | 19 | 17.1 | 64 | 18.6 | 61 |
| 6 | 39.5 | 28.8 | 27 | 25.3 | 36 | 25.3 | 36 |
| 7 | 49.7 | 35.9 | 28 | 22.8 | 54 | 24.8 | 50 |
| 8 | 53.6 | 44.6 | 17 | 28.1 | 48 | 26.0 | 51 |
| 9 | 48.1 | 45.3 | 6 | 28.2 | 41 | 27.9 | 42 |
| 10 | 31.4 | 34.0 | +8* | 26.7 | 15 | 25.2 | 20 |
| 11 | 37.3 | 35.0 | 6 | 23.1 | 38 | 23.9 | 36 |

-continued

| Sample No. | Tensile Strength in Megapascals at 0% RH | 50% RH | % Loss | 90% RH | % Loss | Water Soak | % Loss |
|---|---|---|---|---|---|---|---|
| 12C | 52.9 | 49.0 | 7 | 33.6 | 36 | Not Tested | |

*Sample 10 exhibited an apparent 8% gain in tensile strength following exposure to a 50% humidity atmosphere.

The data in the foregoing table demonstrates that the average loss in tensile strength at 50% relative humidity for samples 1C–5C was about equal to the average loss for samples 6–11, i.e., about 15%. At 90% RH control samples 1C to 5C exhibited an average tensile strength loss of 69%, whereas samples 6–11, which contained a molar ratio of hard to soft segment of at least 5, lost an average of only 39% of their tensile strength. The average tensile strength loss for the samples soaked in water was 56% for samples 1–5 and 39% for samples 6–11. Samples 6 to 11 exhibited a hardness of less than 90 on the Shore A durometer scale.

That which is claimed is:

1. A method for preparing a polyurethane exhibiting a hardness of less than 90 on the Shore A durometer scale and retention of useful tensile properties at a relative humidity greater than 50%, said method comprising heating a reaction mixture comprising an aliphatic or cycloaliphatic diisocyanate, a diol or diamine chain extender [and], at least one polyol, *and up to an equivalent amount, based on said polyol, of a polydiorganosiloxane having two isocyanate-reactive terminal groups* for a period of time sufficient to form said polyurethane, wherein the molar ratio of the combination of said diisocyanate and chain extender to all isocyanate-reactive ingredients other than said chain extender is at least 4:1, respectively, and isolating the resultant polyurethane from said reaction mixture.

2. A method according to claim 1 where said molar ratio is from 4:1 to 7:1.

3. A method according to claim 1 where said diisocyanate is a cycloaliphatic diisocyanate.

4. A method according to claim 1 where said chain extender contains from 2 to 6 carbon atoms.

[5. A method according to claim 1 where up to 50 mole percent of the polyol is replaced by an equivalent amount of a polydiorganosiloxane having terminal groups that react with said diisocyanate.]

6. A method according to claim [5] *1* where the terminal group of said polydiorganosiloxane is

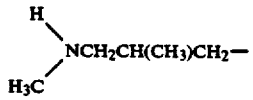

7. A method according to claim 6 where said polydiorganosiloxane is a polydimethylsiloxane.

8. A polyurethane comprising repeating units of the general formulae $$\underset{(1)}{-(O)C\overset{H}{N}R\overset{H}{N}C(O)-},\ \underset{(2)}{-XR'X-},\ \underset{(3)}{-OR''O-}$$

*and diorganosiloxane units* where R represents an alkylene or cycloalkylene radical, R′ represents a hydrocarbylene radical containing from 2 to 10 carbon atoms, R″ represents the residue remaining following removel of the terminal hydroxyl groups of a polyether polyol or a polyester polyol and X is —NH— or —O—, with the proviso that the molar ratio of the combination of units represented by formulae (1) and (2) to all other repeating units in the polyurethane is at least 4:1 [and] the polyurethane exhibits a hardness of less than 90 on the Shore A durometer scale *and the molar concentration of polydiorganosiloxane units does not exceed the molar concentration of —OR″O— units.*

9. A polyurethane according to claim 8 where R represents a cycloalkylene radical.

10. A polyurethane according to claim 8 where R′ contains from 2 to 6 carbon atoms.

11. A polyurethane according to claim 8 where said molar ratio is from 4:1 to 7:1.

[12. A polyurethane according to claim 8 wherein up to 50 mole percent of the —OR″O— units are replaced by divalent polydiorganosiloxane units terminated by an oxygen atom or an aminoalkyl group and exhibiting a molecular weight of at least 200.]

13. A polyurethane according to claim [12] *8* where said polydiorganosiloxane units are polydimethylsiloxane units exhibiting molecular weights of from 540 to 10,000 and are terminated by units of the formula

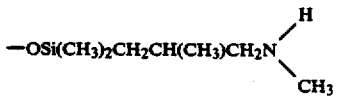

14. A polyurethane prepared by heating a reaction mixture comprising an aliphatic or cycloaliphatic diisocyanate, a diol or diamine chain extender [and], at least one polyol *and a polydiorganosiloxane having two isocyanate-reactive terminal groups* for a period of time sufficient to form said polyurethane, wherein the *molar ratio of polydiorganosiloxane to polyol does not exceed 1:1, and the* molar ratio of the combination of said diisocyanate and chain extender to all isocyanate-reactive ingredients other than said chain extender is at least 4:1, respectively, and isolating the resultant polyurethane from said reaction mixture, where said polyurethane exhibits a hardness of less than 90 on the Shore A durometer scale.

15. A polyurethane according to claim 14 where said molar ratio is from 4:1 to 7:1.

16. A polyurethane according to claim 14 where said diisocyanate is a cycloaliphatic diisocyanate.

17. A polyurethane according to claim 14 where said chain extender contains from 2 to 6 carbon atoms.

[18. A polyurethane according to claim 14 where at least 50 mole percent of the polyol is replaced by an equivalent amount of a polydiorganosiloxane having terminal groups that react with said diisocyanate.]

19. A polyurethane according to claim [18] *14* where said polydiorganosiloxane is an aminoalkyl endblocked polydiorganosiloxane wherein the aminoalkyl radical contains three or four carbon atoms.

[20. A polyurethane according to claim 18 where said polydiorganosiloxane is a polydimethylsiloxane.]

* * * * *